United States Patent
Lee et al.

(10) Patent No.: US 9,885,914 B2
(45) Date of Patent: Feb. 6, 2018

(54) LIQUID CRYSTAL DISPLAY HAVING DIFFERENT UPPER AND LOWER ALIGNMENT LAYERS

(71) Applicant: SAMSUNG DISPLAY CO., LTD., Yongin-si, Gyeonggi-Do (KR)

(72) Inventors: Hyeok Jin Lee, Seongnam-si (KR); Oh Jeong Kwon, Hwaseong-si (KR); Dong Han Song, Hwaseong-si (KR); Sung-Jae Yun, Hwaseong-si (KR); Su Jin Kim, Seoul (KR); Jin Won Kim, Suwon-si (KR); Ki Chul Shin, Seongnam-si (KR); Dong-Chul Shin, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 29 days.

(21) Appl. No.: 14/996,353

(22) Filed: Jan. 15, 2016

(65) Prior Publication Data
US 2016/0266420 A1 Sep. 15, 2016

(30) Foreign Application Priority Data
Mar. 9, 2015 (KR) ........................ 10-2015-0032792

(51) Int. Cl.
*C09K 19/56* (2006.01)
*G02F 1/1337* (2006.01)
(Continued)

(52) U.S. Cl.
CPC ............ *G02F 1/1337* (2013.01); *C09K 19/56* (2013.01); *G02F 1/133345* (2013.01);
(Continued)

(58) Field of Classification Search
CPC ............ G02F 1/1337; G02F 1/133711; G02F 1/133723; G02F 2001/133773;
(Continued)

(56) References Cited

U.S. PATENT DOCUMENTS 8,514,357 B2 8/2013 Kim
8,619,222 B2 12/2013 Nammura et al.
(Continued)

FOREIGN PATENT DOCUMENTS

JP 07-140469 6/1995
JP 2006-085098 3/2006
(Continued)

OTHER PUBLICATIONS

Extended European Search Report dated Nov. 14, 2016 in corresponding European Patent Application No. 16156067.7.
(Continued)

*Primary Examiner* — Ruiyun Zhang
(74) *Attorney, Agent, or Firm* — F. Chau & Associates, LLC

(57) ABSTRACT

A liquid crystal display according to an exemplary embodiment of the present invention includes a first insulation substrate and a pixel electrode disposed on the first insulation substrate. A first alignment layer is disposed on the pixel electrode. A second insulation substrate faces the first insulation substrate. A common electrode is disposed on a surface of the second insulation substrate facing the first insulation substrate. A second alignment layer is disposed on a surface of the common electrode facing the first insulation substrate. A liquid crystal layer is disposed between the first alignment layer and the second alignment layer. The liquid crystal layer includes liquid crystal molecules. One of the
(Continued)

first alignment layer and the second alignment layer has an electron-rich group and the other has an electron-deficient group.

25 Claims, 8 Drawing Sheets

(51) Int. Cl.
*G02F 1/1333* (2006.01)
*G02F 1/1343* (2006.01)
*G02F 1/1362* (2006.01)
*G02F 1/139* (2006.01)

(52) U.S. Cl.
CPC ....... *G02F 1/133711* (2013.01); *G02F 1/1393* (2013.01); *G02F 1/13624* (2013.01); *G02F 1/133707* (2013.01); *G02F 1/134336* (2013.01); *G02F 2001/133397* (2013.01); *G02F 2001/133726* (2013.01); *G02F 2001/133742* (2013.01); *G02F 2001/133773* (2013.01); *G02F 2001/134345* (2013.01); *Y10T 428/1005* (2015.01); *Y10T 428/1023* (2015.01)

(58) Field of Classification Search
CPC ........ G02F 2001/133726; G02F 2001/133742; C09K 19/56; Y10T 428/10; Y10T 428/1005; Y10T 428/1023
USPC ........ 428/1.1, 1.2, 1.25, 1.26; 349/123, 127, 349/128, 130, 134
See application file for complete search history.

(56) References Cited

U.S. PATENT DOCUMENTS

| 8,632,862 | B2 | 1/2014 | Kim et al. |
| 8,830,428 | B2 | 9/2014 | Miyakawa et al. |
| 2011/0134382 | A1* | 6/2011 | Miyakawa ........ G02F 1/133707 349/139 |
| 2011/0157531 | A1 | 6/2011 | Suwa et al. |
| 2012/0314168 | A1 | 12/2012 | Kang et al. |
| 2015/0029449 | A1 | 1/2015 | Woo et al. |
| 2015/0234236 | A1* | 8/2015 | Ohnishi ............ G02F 1/133723 349/123 |

FOREIGN PATENT DOCUMENTS

| KR | 1020100084823 | 7/2010 |
| KR | 1020120089080 | 8/2012 |
| KR | 1020150012093 | 2/2015 |

OTHER PUBLICATIONS

Partial European Search Report dated Aug. 11, 2016 in corresponding European Patent Application No. 16156067.7.

* cited by examiner

LIQUID CRYSTAL DISPLAY HAVING DIFFERENT UPPER AND LOWER ALIGNMENT LAYERS

CROSS-REFERENCE TO RELATED APPLICATION

This application claims priority under 35 U.S.C. § 119 to Korean Patent Application No. 10-2015-0032792 filed in the Korean Intellectual Property Office on Mar. 9, 2015, the disclosure of which is incorporated by reference herein in its entirety.

(a) TECHNICAL FIELD

Exemplary embodiments of the present invention relate to a liquid crystal display, and more particularly to a liquid crystal display having different upper and lower alignment layers.

(b) DISCUSSION OF RELATED ART

A liquid crystal display may be a flat panel display. The liquid crystal display may include two sheets of display panels in which field generating electrodes, such as pixel electrodes and common electrodes, are formed, and a liquid crystal layer disposed between the display panels. The liquid crystal display may apply a voltage to the field generating electrode to generate an electric field in the liquid crystal layer. The electric field may determine the direction of liquid crystal molecules of the liquid crystal layer. The liquid crystal display may display an image by controlling the polarization of incident light.

A vertically aligned mode liquid crystal display, in which liquid crystal molecules may be aligned so that long axes thereof are perpendicular to the upper and lower panels while the electric field is not applied may have a relatively large contrast ratio and a relatively wide reference viewing angle.

Generally, liquid crystal displays have been becoming wider, and curved display devices are being developed to enhance viewer immersion. The curved liquid crystal displays may be realized by forming components on two display panels, attaching the display panels together to prepare a flat-panel liquid crystal display, and then bending the liquid crystal display. The two display panels may be misaligned from each other to generate texture and reduce transmittance.

SUMMARY

Exemplary embodiments of the present invention provide a liquid crystal display that controls texture of misaligned upper and lower panels by providing upper and lower alignment layers that are different from each other.

The liquid crystal display panel according to exemplary embodiments of the present invention may compensate for loss of a common voltage depending on a gray level by forming a predetermined DC voltage through upper and lower alignment layers with different charges.

A liquid crystal display according to an exemplary embodiment of the present invention includes a first insulation substrate and a pixel electrode disposed on the first insulation substrate. A first alignment layer is disposed on the pixel electrode. A second insulation substrate faces the first insulation substrate. A common electrode is disposed on a surface of the second insulation substrate facing the first insulation substrate. A second alignment layer is disposed on a surface of the common electrode facing the first insulation substrate. A liquid crystal layer is disposed between the first alignment layer and the second alignment layer. The liquid crystal layer includes liquid crystal molecules. The first alignment layer includes a first charge and the second alignment layer includes a second charge different from the first charge.

The first alignment layer and the second alignment layer may each include a main chain and a side chain connected to the main chain.

The side chain of the first alignment layer may include an electron-deficient group.

The electron-deficient group may be an amine group.

The side chain of the second alignment layer may include an electron-rich group.

The side chain of the first alignment layer may include a terminal group having the electron-deficient group and the side chain of the second alignment layer may include a terminal group having the electron-rich group.

Each side chain may include a vertical alignment group.

At least one of the side chains of the first alignment layer and the second alignment layer may include a photo-reactive group or a photo-reactive derivative.

The first alignment layer and the second alignment layer may each include a first structure unit represented by Chemical formula 1.

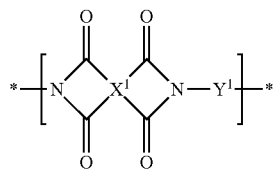

[Chemical formula 1]

In Chemical formula 1, $X^1$ is independently a tetravalent organic group derived from an alicyclic acid dianhydride or an aromatic acid dianhydride, $Y^1$ is a divalent organic group derived from an aromatic diamine, and at least one hydrogen of the divalent organic group is substituted by Chemical formula 1A.

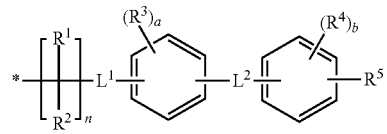

[Chemical formula 1A]

In Chemical formula 1A, $R^1$ to $R^4$ are independently hydrogen or a substituted or unsubstituted C1 to C8 alkyl group, n is an integer between 3 to 20, $R^5$ is a substituted or unsubstituted C1 to C30 alkyl group, a and b are independently an integer between 0 to 4, $L^1$ and $L^2$ are independently the single bond, —O—, —S($=$O)$_2$—, or —(C($R^x$)($R^y$))$_m$— (here, $R^x$ and $R^y$ are independently a hydrogen atom, or a substituted or unsubstituted C1 to C8 alkyl group and m is an integer between 1 to 20).

At least one of the first alignment layer and the second alignment layer may include a second structure unit represented by Chemical formula 2.

[Chemical formula 2]

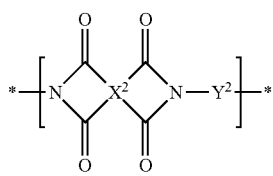

In Chemical formula 2, $X^2$ is independently a tetravalent organic group derived from an alicyclic acid dianhydride or an aromatic acid dianhydride, $Y^2$ is a divalent organic group derived from the aromatic diamine, at least one hydrogen of the divalent organic group is substituted by Chemical formula 2A or Chemical formula 2B.

[Chemical formula 2A]

[Chemical formula 2B]

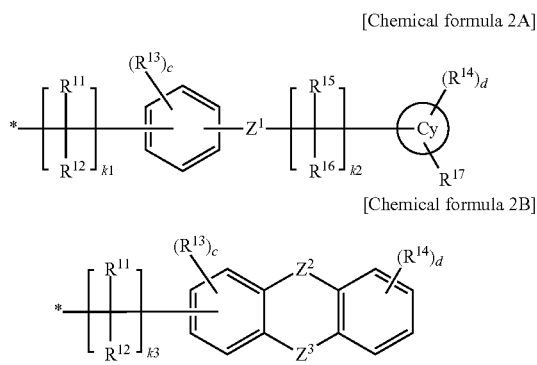

In Chemical formula 2A and Chemical formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, c and d are independently an integer between 0 to 4, k1 and k3 are an integer between 3 to 20, k2 is an integer between 0 to 5, $Z^1$ and $Z^2$ are independently —C(=O)—, and $Z^3$ is —S— or —C(=O)—.

The first alignment layer may include a third structure unit represented by Chemical formula 3.

[Chemical formula 3]

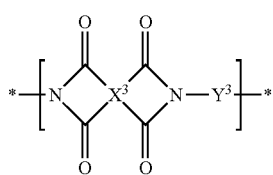

In Chemical formula 3, $X^3$ is independently a tetravalent organic group derived from an alicyclic acid dianhydride or an aromatic acid dianhydride.

$Y^3$ is a divalent organic group derived from an aromatic diamine, at least one hydrogen of the divalent organic group is substituted by a substituted or unsubstituted C5 to C30 straight chain or a branched chain alkyl group (here, —CH$_2$— that are not adjacent to each other in the alkyl group may be substituted by —O—, —N(R$^a$)—, —C(=O)O—, —C(=O)N(R$^b$)—, —N(R$^c$)C(=O)—, or —OC(=O)—, and R$^a$, R$^b$, and R$^c$ are independently hydrogen or a substituted or unsubstituted C1 to C8 alkyl group), and a terminal group of $Y^3$ includes

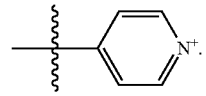

The second alignment layer may include a fourth structure unit represented by Chemical formula 4.

[Chemical formula 4]

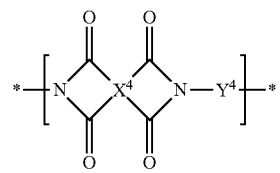

In Chemical formula 4, $X^4$ is independently a tetravalent organic group derived from an alicyclic acid dianhydride or an aromatic acid dianhydride.

$Y^4$ is a divalent organic group derived from an aromatic diamine, at least one hydrogen of the divalent organic group is substituted by a substituted or unsubstituted C5 to C30 straight chain or branched chain alkyl group (here, —CH$_2$— that are not adjacent to each other in the alkyl group may be substituted by —O—, —N(R$^a$)—, —C(=O)O—, —C(=O)N(R$^b$)—, —N(R$^c$)C(=O)—, or —OC(=O)—, and R$^a$, R$^b$, and R$^c$ are substituted independently by hydrogen or the substituted or unsubstituted C1 to C8 alkyl group), and the terminal group of $Y^4$ includes one of

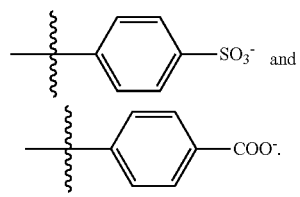

The liquid crystal layer may have a negative dielectric anisotropy.

The liquid crystal layer may further include a reactive mesogen (RM).

At least one of the first alignment layer and the second alignment layer may include an alignment polymer in which the photo-reactive group or the photo-reactive derivative is reacted with the reactive mesogen.

The liquid crystal display may be a curved type liquid crystal display.

The liquid crystal display may be curved in a long side direction.

The liquid crystal molecule adjacent to the first alignment layer may have a pre-tilt angle.

The second alignment layer need not include the photo-reactive group or the photo-reactive derivative.

The liquid crystal molecule adjacent to the second alignment layer need not have the pre-tilt angle.

In the liquid crystal display according to exemplary embodiments of the present invention, the transmittance deterioration depending on the misalignment of the upper and lower panels may be reduced or prevented and the loss of the common voltage depending on the gray level may be compensated for, thus increasing the display quality of the liquid crystal display.

DETAILED DESCRIPTION OF THE EMBODIMENTS

Figure 1:
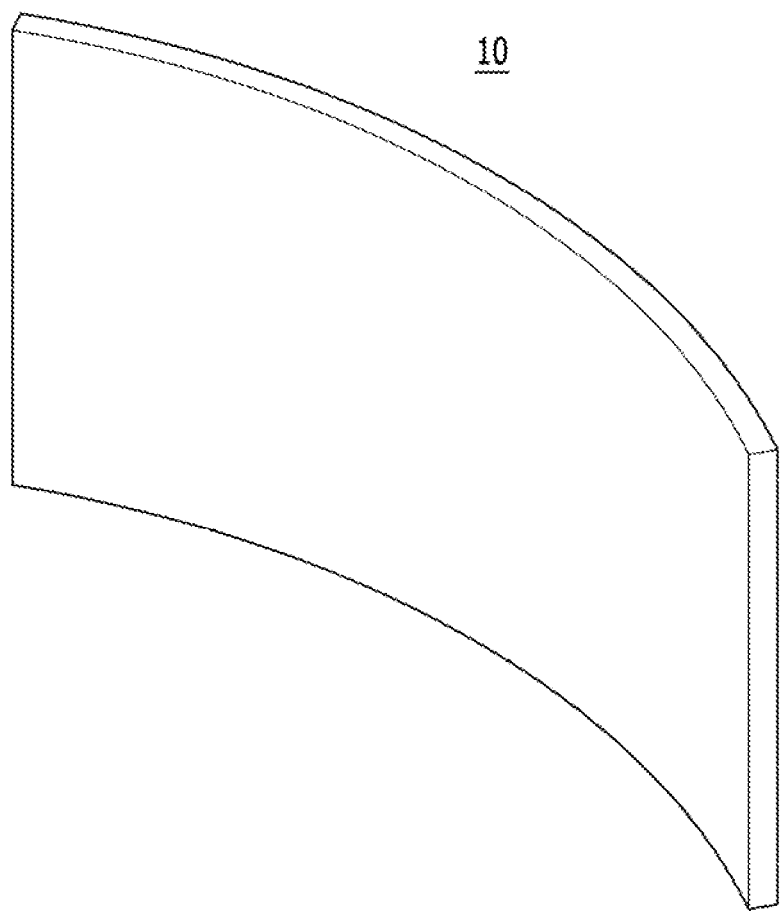
FIG. 1 is a perspective view of a liquid crystal display according to an exemplary embodiment of the present invention.

Exemplary embodiments of the present invention will be described in detail with reference to the accompanying drawings. Exemplary embodiments of the present invention may be modified in many different forms and should not be construed as being limited to the exemplary embodiments set forth herein.

In the specification and drawings, the thickness of layers and regions may be exaggerated for clarity. When a layer is described as being formed on another layer or on a substrate, this may mean that the layer may be formed on the other layer or on the substrate, or a third layer may be disposed between the layer and the other layer or the substrate. Like reference numbers may refer to like elements throughout the specification and drawings.

In the present specification, unless otherwise specifically stated, the term "substituted" means that at least one hydrogen atom is substituted by a substituent of a halogen atom (F, Cl, Br, I), a hydroxyl group, a C1 to C20 alkoxy group, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or salts thereof, a sulfonic acid group or salts thereof, a phosphoric acid group or salts thereof, a C1-C20 alkyl group, a C2-C20 alkenyl group, a C2-C20 alkynyl group, a C6-C30 aryl group, a C3 to C20 cycloalkyl group, a C3 to C20 alkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Unless otherwise specifically stated, the term "hetero" refers to containing at least one hetero atom selected from among N, O, S, and P in a ring group.

Unless otherwise specifically stated, the term "alicyclic group" means a C3 to C40 cycloalkyl, a C3 to C40 cycloalkenyl, a C3 to C40 cycloalkynyl, a C3 to C40 cycloalkylene, a C3 to C40 cycloalkenylene, or a C3 to C40 cycloalkynylene, in detail, a C3 to C20 cycloalkyl, a C3 to C20 cycloalkenyl, a C3 to C20 cycloalkynyl, a C3 to C20 cycloalkylene, a C3 to C20 cycloalkenylene, or a C3 to C20 cycloalkynylene, and "aromatic group" means a C6 to C40 aryl group, a C2 to C40 heteroaryl, a C6 to C40 arylene, or a C2 to C40 heteroarylene, specifically, a C6 to C16 aryl, a C2 to C16 heteroaryl, a C6 to C16 arylene, or a C2 to C16 heteroarylene.

Unless otherwise specifically stated, the term "combination" generally means a mixture or a copolymer, and in an aliphatic organic group and an aromatic organic group, two or more rings form a fusion ring, or two or more rings are connected to each other by a functional group of a single bond, —O—, —S—, —C(=O)—, —CH(OH)—, —S(=O)—, —S(=O)$_2$—, —Si CH$_{32}$—, —CH$_{2p}$— (here, $1 \leq p \leq 2$), —CF$_{2q}$— (here, $1 \leq q \leq 2$), —C CH$_{32}$—, —C CF$_{32}$—, —C CH$_3$ and CF$_3$—, or —C(=O)NH—. Here, "copolymerization" means a block copolymerization or a random copolymerization, and "copolymer" means a block copolymer or a random copolymer.

Figure 2:
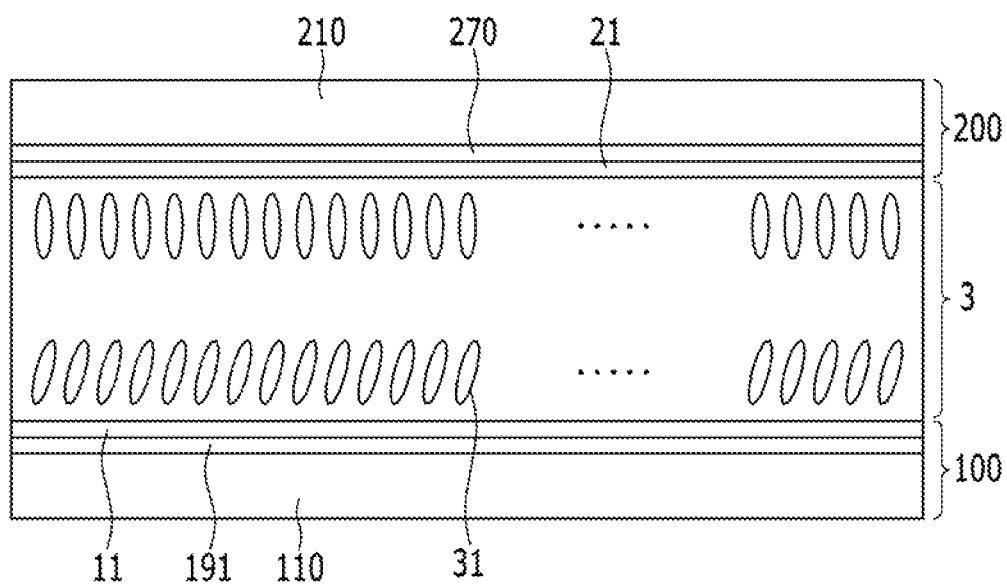
FIG. 2 is a cross-sectional view of partial constituent elements according to an exemplary embodiment of the present invention.

A liquid crystal display according to an exemplary embodiment of the present invention will be described with reference to FIG. 1 and FIG. 2. FIG. 1 is a perspective view of a liquid crystal display according to an exemplary embodiment of the present invention. FIG. 2 is a cross-sectional view of partial constituent elements according to an exemplary embodiment of the present invention.

As shown in FIG. 1, a liquid crystal display 10 according to an exemplary embodiment of the present invention may have a curved type. The liquid crystal display 10 may be curved in a horizontal direction of a long axis or a vertical direction of a short axis. The liquid crystal display 10 curved in the long axis direction is described according to exemplary embodiments of the present invention, however exemplary embodiments of the liquid crystal display 10 are not limited thereto and the liquid crystal display curved 10 may be curved in the short axis or a flat display may be implemented.

Referring to FIG. 2, a lower panel 100 of the liquid crystal display 10 according to an exemplary embodiment of the present invention may include a pixel electrode 191 disposed on a first insulation substrate 110 and a first alignment layer 11 disposed on the pixel electrode 191. A liquid crystal layer 3 may be disposed between the lower panel 100 and the upper panel 200. Liquid crystal molecules 31 may be adjacent to the first alignment layer 11. The liquid crystal molecules 31 may have a pre-tilt angle. The liquid crystal molecules 31 may be tilted with respect to the first alignment layer 11. The pre-tilt refers to the obliqueness with respect to a direction perpendicular to the surface of the first alignment layer 11 or the second alignment layer 21.

An upper panel 200 of the liquid crystal display may include a second insulation substrate 210 facing the first insulation substrate 110, a common electrode 270 disposed on a surface of the second insulation substrate 210 facing the first insulation substrate 110, and a second alignment layer 21 disposed on a surface of the common electrode 270 facing the first insulation substrate 110. Liquid crystal molecules 31 may be adjacent to the second alignment layer 21 according to an exemplary embodiment of the present invention. The liquid crystal molecules 31 may be aligned vertically without having a pre-tilt angle.

As described above, in the liquid crystal display 10 according to exemplary embodiments of the present invention, the liquid crystal molecules 31 adjacent to each of the first and second alignment layers 11 and 21 facing each other may be differently aligned. Although there may be a misalignment between the upper panel 200 and the lower panel 100, an occurrence of a texture may be reduced or prevented from being generated depending on the deviation direction of the liquid crystal molecules 31 in relation to the lower panel 100 due to the upper panel 200 without the pre-tilt. Thus, a transmittance reduction may be controlled.

Hereafter, the first alignment layer 11 and the second alignment layer 21 will be described in more detail. Each of the first and second alignment layers 11 and 21 according to an exemplary embodiment of the present invention may be formed by different liquid crystal alignment agents including a main chain and a side chain.

According to an exemplary embodiment of the present invention, the first alignment layer 11 may include a first structure unit represented by Chemical formula 1 and a second structure unit represented by Chemical formula 2.

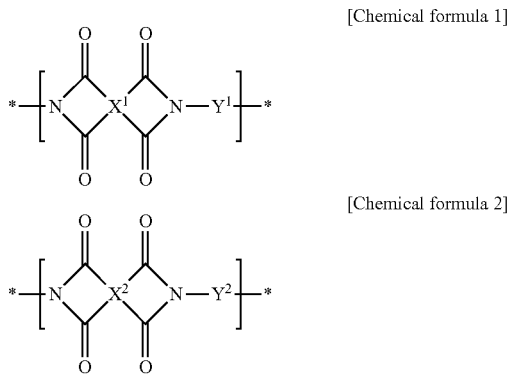

[Chemical formula 1]

[Chemical formula 2]

In Chemical formula 1 and 2, $X^1$ and $X^2$ are independently a tetravalent organic group derived from an alicyclic acid dianhydride or an aromatic acid dianhydride, $Y^1$ is a divalent organic group derived from an aromatic diamine, at least one hydrogen of the divalent organic group is substituted by Chemical formula 1A, $Y^2$ is a divalent organic group derived from the aromatic diamine, and at least one hydrogen of the divalent organic group is substituted by Chemical formula 2A or Chemical formula 2B.

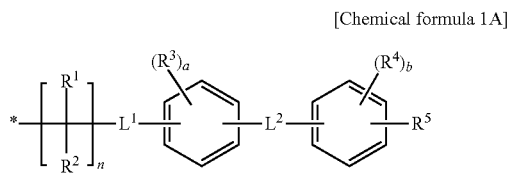

[Chemical formula 1A]

In Chemical formula 1A, $R^1$ to $R^4$ are independently hydrogen or a substituted or unsubstituted C1 to C8 alkyl group, n is an integer between 3 to 20, $R^5$ is a substituted or unsubstituted C1 to C30 alkyl group, a and b are independently an integer between 0 to 4, $L^1$ and $L^2$ are independently a single bond, —O—, —S(=O)$_2$—, or —(C($R^x$)($R^y$))$_m$— (e.g., $R^x$ and $R^y$ may each independently be a hydrogen atom, or a substituted or unsubstituted C1 to C8 alkyl group and m may be an integer between 1 to 20).

$Y^1$ is a divalent organic group derived from an aromatic diamine. When at least one hydrogen of the divalent organic group is substituted by Chemical formula 1A, Chemical formula 1A may function like a vertical alignment group vertically aligning the liquid crystal molecule 31 adjacent to the first alignment layer 11.

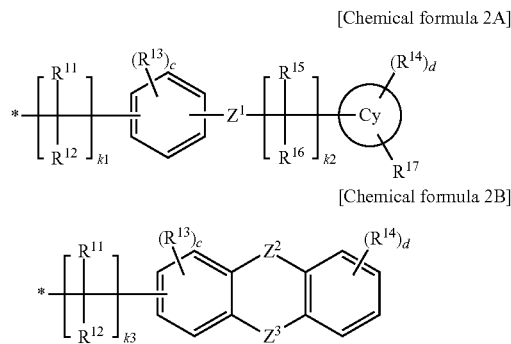

[Chemical formula 2A]

[Chemical formula 2B]

In Chemical formula 2A and Chemical formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, c and d are independently an integer between 0 to 4, k1 and k3 are an integer between 3 to 20, k2 is an integer between 0 to 5, $Z^1$ and $Z^2$ are independently —C(=O)—, and $Z^3$ is —S— or —C(=O)—.

The second structure unit represented by Chemical formula 2 may function as a photo reaction group and may be reacted with a reactive mesogen (RM) included in the liquid crystal layer 3. The reactive mesogen combined by the reaction may form an alignment polymer, and thus the liquid crystal molecule 31 adjacent to the first alignment layer 11 may have the pre-tilt angle.

The liquid crystal layer 3 may be disposed between the first insulation substrate 110 and the second insulation substrate 210 to comprise the liquid crystal molecule 31. After the liquid crystal molecules 31 are disposed between the first insulation substrate 110 and the second insulation substrate 210, if a voltage is applied and ultraviolet rays (UV) are radiated to the liquid crystal molecules 31, the substituent represented by Chemical formula 2A or Chemical formula 2B may generate a radical and may be reacted with the reactive mesogen in the liquid crystal layer 3 to be combined. That is, the reactive mesogen may be reacted with Chemical formula 2A or 2B to form the alignment polymer, and thus the liquid crystal molecules 31 adjacent to the first alignment layer 11 may be inclined to have the pre-tilt angle.

The first alignment layer 11 may include a third structure unit represented by Chemical formula 3.

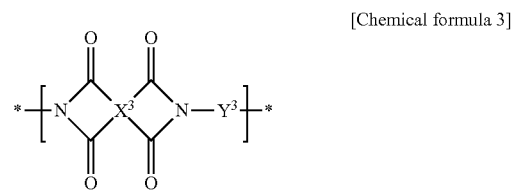

[Chemical formula 3]

According to an exemplary embodiment of the present invention, in Chemical formula 3, $X^3$ is independently a tetravalent organic group derived from an alicyclic acid dianhydride or an aromatic acid dianhydride, $Y^3$ is a divalent organic group derived from an aromatic diamine, at least one hydrogen of the divalent organic group is substituted by a substituted or unsubstituted C5 to C30 straight chain or a branched chain alkyl group (here, —CH$_2$— that are not adjacent to each other in the alkyl group may be substituted by —O—, —N(R$^a$)—, —C(=O)O—, —C(=O)N(R$^b$)—, —N(R$^c$)C(=O)—, or —OC(=O)—, and R$^a$, R$^b$, and R$^c$ are independently hydrogen or a substituted or unsubstituted C1 to C8 alkyl group), and a terminal group of Y$^3$ includes

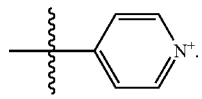

The terminal group of Y$^3$ is not limited thereto and any amine group having the positive charge may be used, and as described above, the terminal group of Y$^3$ including the electron-deficient group may allow the first alignment layer 11 to have the positive charge.

The second alignment layer 21 may include the first structure unit represented by Chemical formula 1.

[Chemical formula 1]

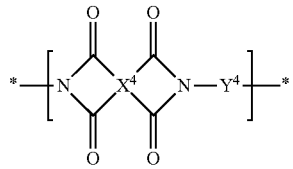

According to an exemplary embodiment of the present invention, in Chemical formula 1, X$^1$ is independently a tetravalent organic group derived from an alicyclic acid dianhydride or an aromatic acid dianhydride, Y$^1$ is a divalent organic group derived from an aromatic diamine, and at least one hydrogen of the divalent organic group is substituted by Chemical formula 1A.

[Chemical formula 1A]

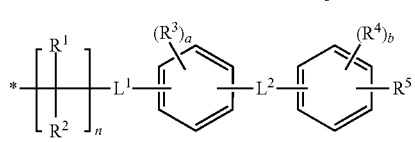

In Chemical formula 1A, R$^1$ to R$^4$ are independently hydrogen or a substituted or unsubstituted C1 to C8 alkyl group, n is an integer between 3 to 20, R$^5$ is a substituted or unsubstituted C1 to C30 alkyl group, a and b are independently an integer between 0 to 4, L$^1$ and L$^2$ are independently the single bond, —O—, —S(=O)$_2$—, or —(C(R$^x$)(R$^y$))$_m$— (e.g., R$^x$ and R$^y$ may each independently be a hydrogen atom, or a substituted or unsubstituted C1 to C8 alkyl group and m may be an integer between 1 to 20).

The second alignment layer 21 may include a fourth structure unit represented by Chemical formula 4.

[Chemical formula 4]

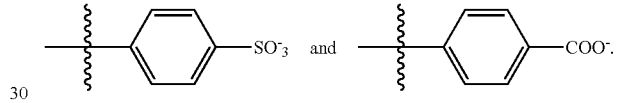

According to an exemplary embodiment of the present invention, in Chemical formula 4, X$^4$ is independently a tetravalent organic group derived from an alicyclic acid dianhydride or an aromatic acid dianhydride, Y$^4$ is a divalent organic group derived from an aromatic diamine, at least one hydrogen of the divalent organic group is substituted by a substituted or unsubstituted C5 to C30 straight chain or branched chain alkyl group (here, —CH$_2$— that are not adjacent to each other in the alkyl group may be substituted by —O—, —N(R$^a$)—, —C(=O)O—, —C(=O)N(R$^b$)—, —N(R$^c$)C(=O)—, or —OC(=O)—, and R$^a$, R$^b$, and R$^c$ are substituted independently by hydrogen or the substituted or unsubstituted C1 to C8 alkyl group), and the terminal group of Y$^4$ includes one of

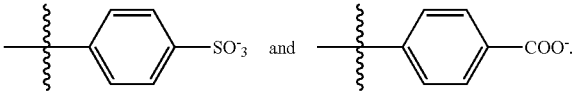

The terminal group of Y$^4$ is not limited thereto and any terminal group including an electron-rich group may be used. The terminal group of Y$^4$ including the electron-rich may allow the second alignment layer 21 to be negatively charged.

The second alignment layer 21 according to an exemplary embodiment of the present invention does not include the second structure unit represented by Chemical formula 2 having the photo reaction group, and the liquid crystal molecule 31 adjacent to the second alignment layer 21 is aligned vertically through the first structure unit represented by Chemical formula 1 having the vertical alignment function. That is, the liquid crystal molecule 31 adjacent to the second alignment layer 21 need not have the pre-tilt angle.

The first alignment layer 11 may be positively charged, and the second alignment layer 21 may be negatively charged. Accordingly, the first alignment layer 11 and the second alignment layer 21 may form a predetermined DC voltage regardless of the voltage applied to each electrode. Although a loss of a common voltage may occur depending on a gray level, the predetermined DC voltage formed by the first and second alignment layers 11 and 21 may be compensated for, thereby providing the liquid crystal display with increased display quality.

The liquid crystal alignment agent forming the first alignment layer 11 and the second alignment layer 21 according to an exemplary embodiment of the present invention may include polyimide. The polyimide may copolymerize at least one acid dianhydride selected from an alicyclic acid dianhydride and an aromatic acid dianhydride and an aromatic diamine to manufacture the polyamic acid and to be imidized. The manufacturing method of the polyamic acid is not limited to known methods used for the synthesis of the polyamic acid.

The alicyclic acid dianhydride may include at least one selected from 1,2,3,4-cyclobutanetetracarboxylic acid dianhydride(CBDA), 2,3,4,5-tetrahydrofurantetracarboxylic acid dianhydride, 5-(2,5-dioxotetrahydrofuryl)-3-methylcyclohexene-1,2-dicarboxylic acid anhydride (DOCDA), bicyclooctene-2,3,5,6-tetracarboxylic acid dianhydride(BODA), 1,2,3,4-cyclopentanetetracarboxylic acid dianhydride (CPDA), 1,2,4,5-cyclohexanetetracarboxylic acid dianhydride(CHDA), 1,2,4-tricarboxy-3-methylcarboxy cyclopentane dianhydride, 1,2,3,4-tetracarboxy cyclopentane dianhydride, 3,4-dicarboxy-1-cyclohexyl succinic acid dianhydride, 3,4-dicarboxy-1,2,3,4-tetrahydro-1-naphthalene succinic acid dianhydride, and 2,3,5-tricarboxycyclopentyl acetateacid dianhydride (2,3,5-tricarboxycyclopentyl acetic acid dianhydride, TCA-AH), but exemplary embodiments of the present invention are not limited thereto.

The aromatic acid dianhydride may include at least one selected from pyromellitic acid dianhydride(PMDA), biphthalic acid anhydride(BPDA), oxydiphthalic acid dianhydride(ODPA), benzophenonetetracarboxylic acid dianhydride(BTDA) and hexafluoroisopropylidenediphthalicdianhydride (6-FDA), but exemplary embodiments of the present invention are not limited thereto.

The liquid crystal alignment agent forming the first alignment layer 11 and the second alignment layer 21 may include a solvent. By including the solvent, the liquid crystal alignment agent may have relatively high spreadability and a stickiness with the substrate may be obtained.

Examples of the solvent according to exemplary embodiments of the present invention include N-methyl-2-pyrrolidone; N,N-dimethyl acetamide; N,N-dimethyl formamide; dimethyl sulfoxide; γ-butyrolactone; tetrahydrofuran(THF); and a phenol-based solvent such as meta-cresols, phenols, halogenated phenols, but exemplary embodiments of the present invention are not limited thereto.

The solvent may include 2-dutyl cellosolve (2-BC), which may increase printability. The 2-dutyl cellosolve may be included at 1 to about 50 wt % of the total content of the solvent including the 2-dutyl cellosolve, and more specifically, may be included at about 10 to about 40 wt % of the total content of the solvent including the 2-dutyl cellosolve. When the 2-dutyl cellosolve is included such range, the printability may be increased.

The solvent may include alcohol series, ketone series, ester series, ether series, hydrogen carbon series, or halogenated hydrogen carbon series as a poor solvent with a concentration in a range in which a soluble polyimide polymer is not precipitated. The poor solvents may reduce a surface energy of the liquid crystal alignment agent, and may increase the spreadability and flatness of a coating.

The poor solvent may be included at 1 to about 90 wt % of the total content of the solvent including the poor solvent, and more specifically, may be included at 1 to about 70 wt % of the total content of the solvent including the poor solvent.

An example of the poor solvent according to an exemplary embodiment of the present invention may use one selected from methanol, ethanol, isopropanol, cyclohexanol, ethylene glycol, propylene glycol, 1,4-butanediol, triethylene glycol, acetone, methylethyl ketone, cyclo hexanone, methylacetate, ethylacetate, butyl acetate, diethyloxalate, malonate ester, diethylether, ethylene glycol monomethylether, ethylene glycol dimethylether, ethylene glycol monoethylether, ethylene glycol phenylether, ethylene glycol phenylmethylether, ethylene glycol phenylethylether, diethylene glycol dimethylether, diethyleneglycol ether, diethylene glycol monomethylether, diethylene glycol monoethylether, diethylene glycol monomethylether acetate, diethylene glycol monoethylether acetate, ethylene glycol methylether acetate, ethylene glycol ethylether acetate, 4-hydroxy-4-methyl-2-pentanone, 2-hydroxy ethyl propionate, 2-hydroxy-2-methyl ethyl propionate, ethoxy ethyl acetate, hydroxy ethyl acetate, 2-hydroxy-3-methyl methyl butanoate, 3-methoxy methyl propionate, 3-methoxy ethyl propionate, 3-ethoxy ethyl propionate, 3-ethoxy methyl propionate, methyl methoxy butanol, ethyl methoxy butanol, methyl ethoxy butanol, ethyl ethoxy butanol, tetrahydrofuran, dichloromethane, 1,2-dichloroethane, 1,4-dichloro butane, tri chloro ethane, chlorobenzene, o-dichlorobenzene, hexane, heptane, octane, benzene, toluene, xylene, and combinations thereof.

The liquid crystal alignment agent for forming the first alignment layer 11 and the second alignment layer 21 may include other additives.

The other additives may include an epoxy compound. The epoxy compound may be used to increase the reliability and an electro-photo characteristic. The epoxy compound may include at least one epoxy compound including a 2 to 8 epoxy group, and more specifically, a 2 to 4 epoxy group.

The epoxy compound may be included at 0.1 to about 50 parts by weight of the polyimide, and more specifically, may be included at 1 to about 30 parts by weight parts by weight of the polyimide. When the epoxy compound is included in the above range, while showing printability and flatness on the coating on the substrate, the reliability and the electrophoto characteristic may be increased.

Examples of the epoxy compound according to an exemplary embodiment of the present invention include N,N,N',N'-tetraglycidyl-4,4'-diaminophenylmethane(TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycolglycidylether, polyethyleneglycolglycidylether, propyleneglycolglycidylether, tripropyleneglycolglycidylether, polypropyleneglycolglycidylether, neopentylglycolglycidylether, 1,6-hexane dioldiglycidylether, glycerin diglycidylether, 2,2-dibromo-neopentylglycolglycidylether, 1,3,5,6-tetraglycidyl-2,4-hexane diol, N,N,N',N'-tetraglycidyl-1,4-phenylene diamine, N,N,N',N'-tetraglycidyl-m-xylene diamine, N,N,N',N'-tetraglycidyl-2,2'-dimethyl-4,4'-diaminobiphenyl, 2,2-bis [4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, and 1,3-bis(N,N-diglycidylaminomethyl)benzene, but exemplary embodiments of the present invention are not limited thereto.

To increase the printability, a surfactant or a coupling agent may be included in the liquid crystal alignment agent.

The first and second liquid crystal alignment layers 11 and 21 may be formed by coating the liquid crystal alignment agent on the substrate. A method of coating the liquid crystal alignment agent on the substrate may include a spin coating method, a flexo printing method, and an inkjet method. The flexo printing method may provide relatively high uniformity of the coated layer and a relatively large sized coating layer may be formed.

To increase the uniformity of the coated layer, after the liquid crystal alignment agent is uniformly coated on the substrate, a pre-dry may be performed at a temperature from room temperature to about 200° C., and more specifically, at a temperature of from about 30° C. to about 150° C., and even more specifically, at a temperature of from about 40° C. to about 120° C., for the duration of 1 minute to about 100 minutes. Through the pre-dry, by adjusting the volatility of each component of the liquid crystal alignment agent, a uniformly coated layer without a deviation may be obtained.

Next, a firing may be performed at a temperature of from about 80° C. to about 300° C., specifically at a temperature of from about 120° C. to about 280° C. for a duration of from about 5 minutes to about 300 minutes to evaporate the solvent. Thus, the alignment layers 11 and 21 may be formed.

The first alignment layer 11 may include the vertical alignment group (e.g., the vertical alignment group included in the first structure unit represented by Chemical formula 1 as the side chain) and the photo reactive group (e.g., the photo reactive group included in the second structure unit represented by Chemical formula 2 as the side chain), and the liquid crystal molecules 31 adjacent to the first alignment layer 11 may have the pre-tilt angle due to the alignment polymer in which the photo-reactive group and the reactive mesogen are combined according to the manufacturing process according to an exemplary embodiment of the present invention. The second alignment layer 21 may include the vertical alignment group (e.g., the vertical alignment group included in the first structure unit represented by Chemical formula 1 as the side chain), and thus the liquid crystal molecules 31 adjacent to the second alignment layer 21 may be vertically aligned.

Although the upper and lower panels 100 and 200 may be misaligned, an occurrence of deviation in the arrangement directions of the liquid crystal molecules 31 adjacent to the first alignment layer 11 and the liquid crystal molecules 31 adjacent to the second alignment layer 21 may be reduced or prevented. Thus, an occurrence of the texture generation may be reduced or prevented.

Since the DC voltage may be formed between the first alignment layer 11 (e.g., the positively charged alignment layer according to an exemplary embodiment of the present invention) and the second alignment layer 21 (e.g., the negatively charged alignment layer according to an exemplary embodiment of the present invention) that are differentially charged, the loss of the common voltage depending on the gray level may be compensated for through the DC voltage.

Figure 3:
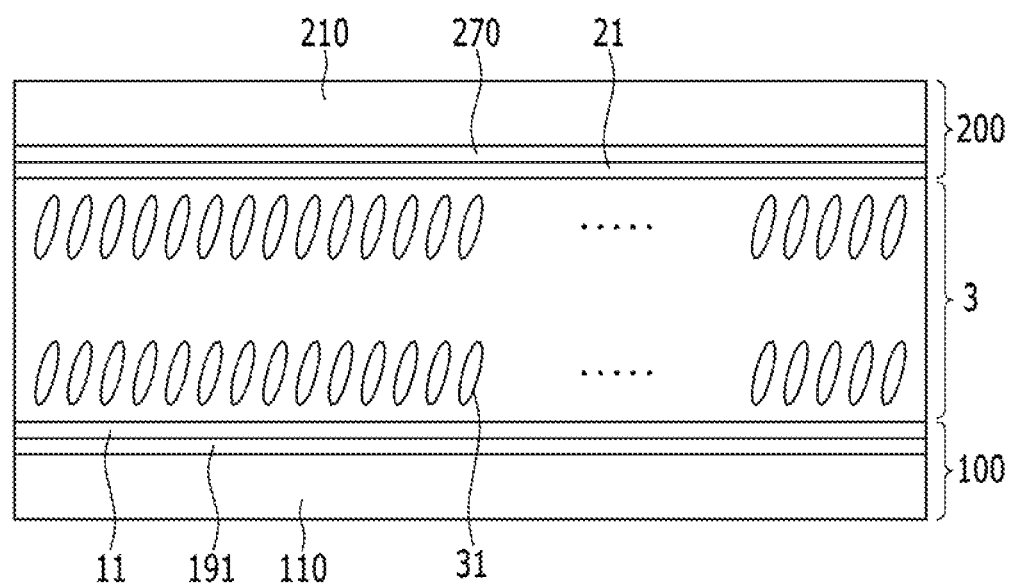
FIG. 3 is a cross-sectional view of partial constituent elements according to another exemplary embodiment of the present invention.

The liquid crystal display according to another exemplary embodiment of the present invention will be described with reference to FIG. 3. FIG. 3 is a cross-sectional view of partial constituent elements according to another exemplary embodiment of the present invention.

The first alignment layer 11 according to another exemplary embodiment of the present invention may be substantially the same as the first alignment layer 11 according to the exemplary embodiment of the present invention described with reference to FIG. 1 and FIG. 2.

The second alignment layer 21 according to another exemplary embodiment of the present invention may include the second structure unit represented by Chemical formula 2 as well as the first structure unit represented by Chemical formula 1 and the fourth structure unit represented by Chemical formula 4.

[Chemical formula 2]

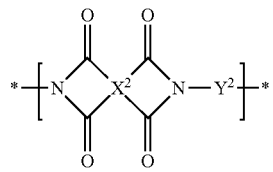

According to an exemplary embodiment of the present invention, in Chemical formula 2, $X^2$ is independently the tetravalent organic group derived from the alicyclic acid dianhydride or the aromatic acid dianhydride, $Y^2$ is the divalent organic group derived from the aromatic diamine, and at least one hydrogen of the divalent organic group is substituted by Chemical formula 2A or Chemical formula 2B.

[Chemical formula 2A]

[Chemical formula 2B]

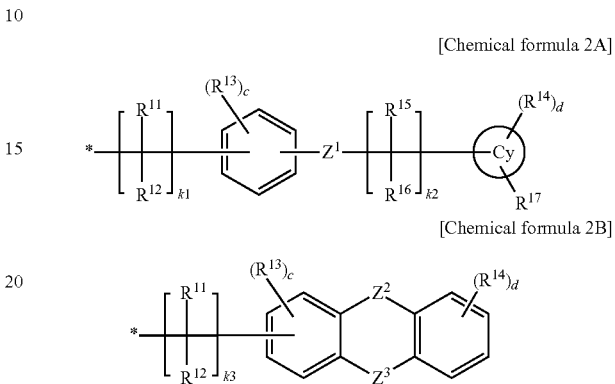

According to an exemplary embodiment of the present invention, in Chemical formula 2A and Chemical formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, c and d are independently an integer between 0 to 4, k1 and k3 are an integer between 3 to 20, k2 is an integer between 0 to 5, $Z^1$ and $Z^2$ are independently —C(=O)—, and $Z^3$ is —S— or —C(=O)—.

According to another exemplary embodiment of the present invention, the first alignment layer 11 and the second alignment layer 21 both include the second structure unit represented by Chemical formula 2, and the second structure unit has the side chain functioning as the photo reactive group. Accordingly, the photo-reactive group and the reactive mesogen may be reacted in both first alignment layer 11 and second alignment layer 21, and the liquid crystal molecules 31 adjacent to the upper and lower panels 200 and 100 may have the pre-tilt angle due to the alignment polymer in which the photo-reactive group and the reactive mesogen are combined.

The liquid crystal display according to another exemplary embodiment of the present invention may be a flat panel display. Thus, the upper and lower panels 200 and 100 may be misaligned such that the arrangements of the liquid crystal molecules 31 may deviate when the display panel is curved.

The first alignment layer 11 may include the vertical alignment group (e.g., the vertical alignment group included in the first structure unit represented by Chemical formula 1 as the side chain) and the photo-reactive group (e.g., the photo-reactive group included in the second structure unit represented by Chemical formula 2 as the side chain), and the liquid crystal molecules 31 adjacent to the first alignment layer 11 may have the pre-tilt angle due to the alignment polymer in which the reactive mesogen is reacted according to the manufacturing process according to exemplary embodiments of the present invention. The second alignment layer 21 may include the vertical alignment group (e.g., the vertical alignment group included in the first structure unit represented by Chemical formula 1 as the side chain) and the photo-reactive group (e.g., the photo-reactive group included in the second structure unit represented by Chemical formula 2 as the side chain), and the liquid crystal molecules 31 adjacent to the second alignment layer 21 may also have the pre-tilt angle.

According to an exemplary embodiment of the present invention, when the first alignment layer 11 (e.g., the positively charged alignment layer according to an exemplary embodiment of the present invention) and the second alignment layer 21 (e.g., the negatively charged alignment layer according to an exemplary embodiment of the present invention) are differentially charged form the DC voltage, the loss of the common voltage depending on the gray level may be compensated for through the DC voltage.

Figure 4:
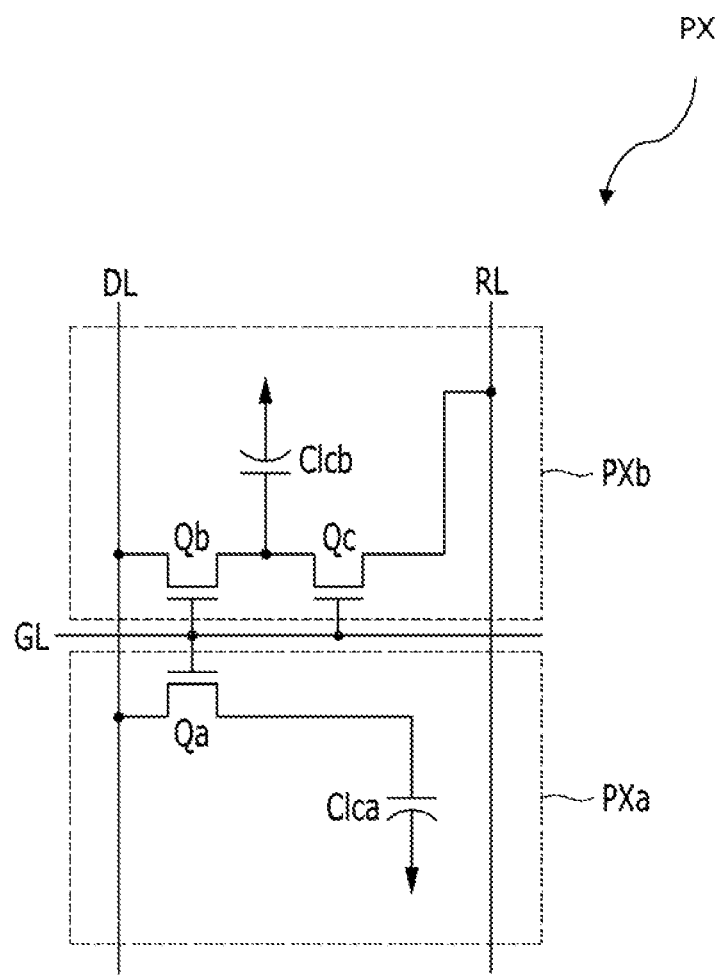
FIG. 4 is a circuit diagram of one pixel according to an exemplary embodiment of the present invention.
Figure 5:
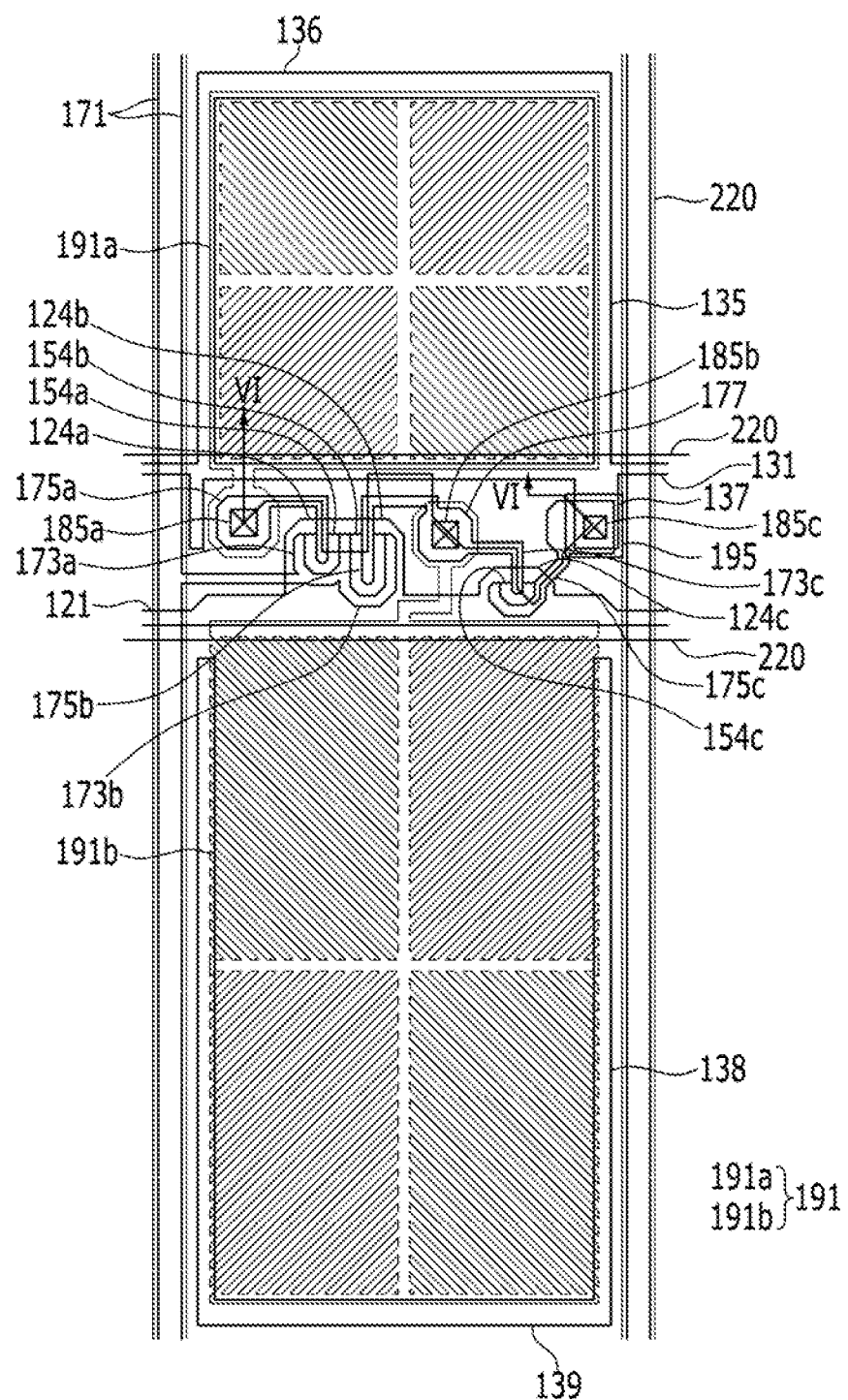
FIG. 5 is a plane layout view of one pixel according to an exemplary embodiment of the present invention.
Figure 6:
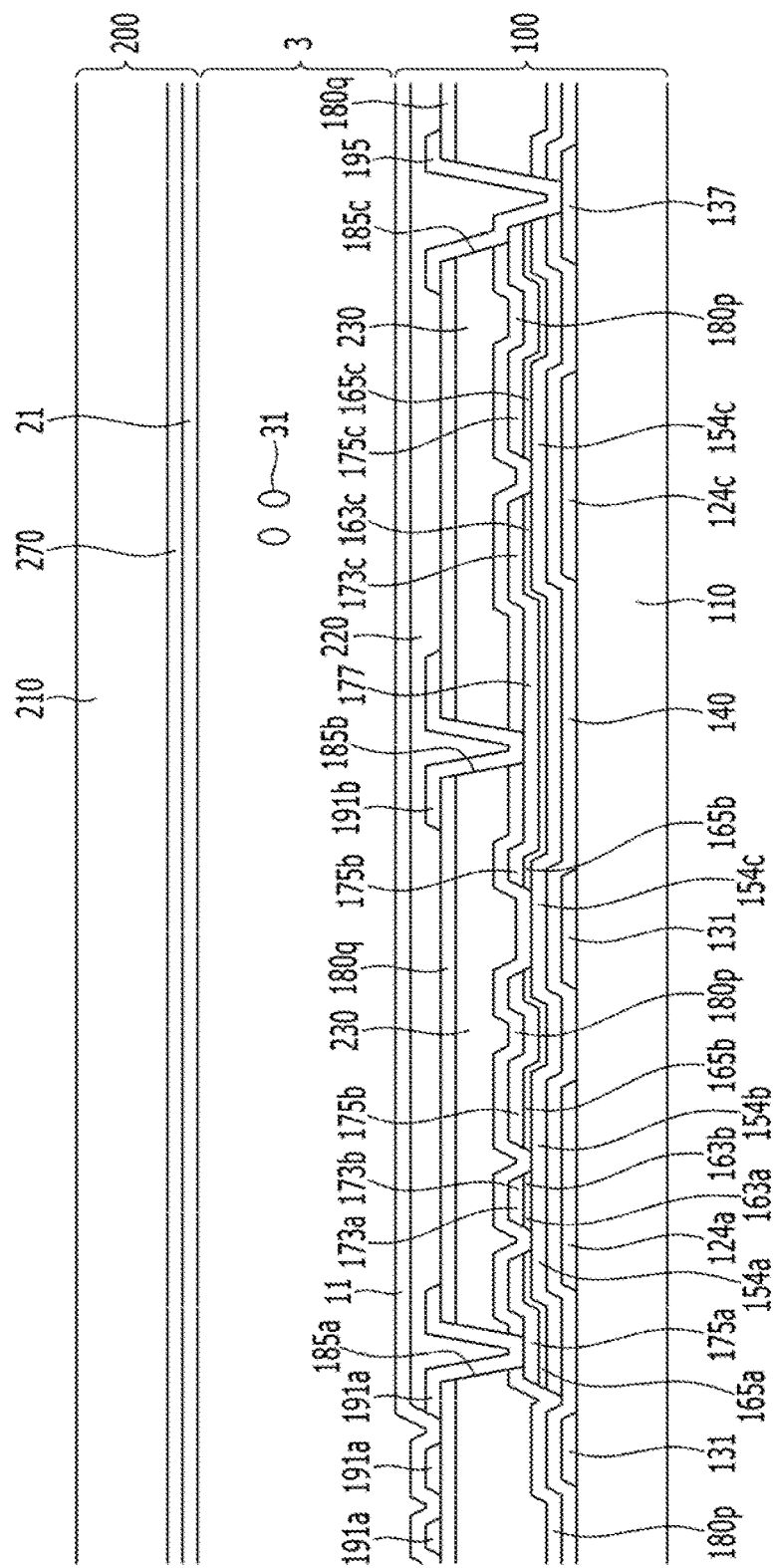
FIG. 6 is a cross-sectional view taken along a line VI-VI of FIG. 5.
Figure 7:
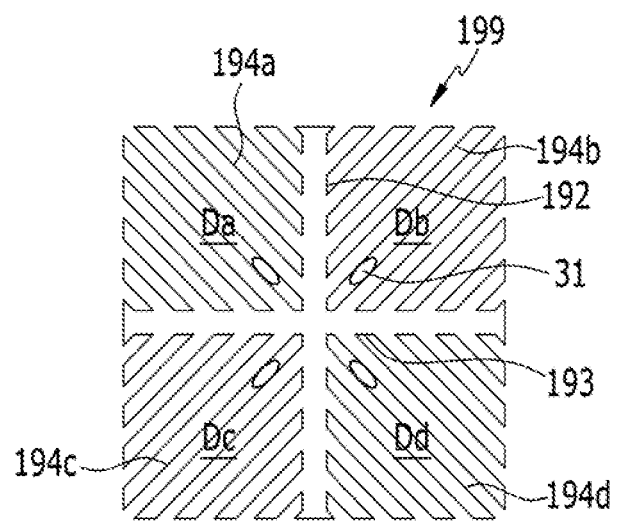
FIG. 7 is a top plan view of a pixel according to an exemplary embodiment of the present invention.

The liquid crystal display according to an exemplary embodiment of the present invention will be described below with reference to FIG. 4 to FIG. 7. FIG. 4 is a circuit diagram of one pixel according to an exemplary embodiment of the present invention. FIG. 5 is a plane layout view of one pixel according to an exemplary embodiment of the present invention. FIG. 6 is a cross-sectional view taken along a line VI-VI of FIG. 5. FIG. 7 is a top plan view of a pixel according to an exemplary embodiment of the present invention.

Referring to FIG. 4, one pixel PX (e.g., the pixel PX including a first sub-pixel electrode PXa and a second sub-pixel electrode PXb) of the liquid crystal display according to an exemplary embodiment of the present invention may include a plurality of signal lines including a gate line GL transferring a gate signal, a data line DL transferring a data signal, and a divided voltage reference voltage line RL transferring a divided voltage reference voltage. The one pixel PX may include first, second, and third switching elements Qa, Qb, and Qc, and first and second liquid crystal capacitors Clca and Clcb connected to the plurality of signal lines.

The first and second switching elements Qa and Qb may be connected to the gate line GL and the data line DL, respectively, and the third switching element Qc may be connected to an output terminal of the second switching element Qb and the divided voltage reference voltage line RL.

The first switching element Qa and the second switching element Qb may each be a three terminal element such as a thin film transistor. A control terminal of each of the first switching element Qa and the second switching element Qb may be connected to the gate line GL, an input terminal of each of the first switching element Qa and the second switching element Qb may be connected to the data line DL. An output terminal of the first switching element Qa may be connected to the first liquid crystal capacitor Clca, and the output terminal of the second switching element Qb may be connected to the second liquid crystal capacitor Clcb and an input terminal of the third switching element Qc.

The third switching element Qc may be the three terminal element such as the thin film transistor. The control terminal of the third switching element Qc may be connected to the gate line GL. The input terminal of the third switching element Qc may be connected to the second liquid crystal capacitor Clcb. The output terminal of the third switching element Qc may be connected to the divided voltage reference voltage line RL.

If a gate on signal is applied to the gate line GL, the first switching element Qa, the second switching element Qb, and the third switching element Qc connected to the gate line GL may be turned on. Accordingly, the data voltage applied to the data line DL may be applied to the first sub-pixel electrode PXa and the second sub-pixel electrode PXb through the first switching element Qa and the second switching element Qb that are turned on. The data voltages applied to the first sub-pixel electrode PEa and the second sub-pixel electrode PEb may be the same as each other, and the first liquid crystal capacitor Clca and the second liquid crystal capacitor Clcb may be charged by the same value as a difference between the common voltage and the data voltage. Substantially simultaneously, the voltage charged in the second liquid crystal capacitor Clcb may be divided through the turned-on third switching element Qc. Thus, a value of the voltage charged in the second liquid crystal capacitor Clcb may be reduced by a difference between the common voltage and the divided voltage reference voltage. That is, the voltage charged in the first liquid crystal capacitor Clca may become higher than the voltage charged in the second liquid crystal capacitor Clcb.

Accordingly, the voltage charged in the first liquid crystal capacitor Clca and the voltage charged in the second liquid crystal capacitor Clcb may become different from each other. Since the voltage of the first liquid crystal capacitor Clca and the voltage of the second liquid crystal capacitor Clcb may be different from each other, inclination angles of liquid crystal molecules 31 in a first sub-pixel and a second sub-pixel may become different from each other, and thus luminances of the two sub-pixels may become different from each other. Accordingly, if the voltage of the first liquid crystal capacitor Clca and the voltage of the second liquid crystal capacitor Clcb are adjusted, an image viewed in a lateral surface may be substantially the same as an image viewed in a front, and thus lateral surface visibility may be increased.

According to an exemplary embodiment of the present invention, to make the voltage charged in the first liquid crystal capacitor Clca and the voltage charged in the second liquid crystal capacitor Clcb different, the third switching element Qc connected to the second liquid crystal capacitor Clcb and the divided voltage reference voltage line RL may be included. In the liquid crystal display according to another exemplary embodiment of the present invention, the second liquid crystal capacitor Clcb may be connected to a step-down capacitor.

The third switching element including a first terminal connected to a step-down gate line, a second terminal connected to the second liquid crystal capacitor Clcb, and a third terminal connected to a step-down capacitor may charge a portion of an amount of electric charges charged in the second liquid crystal capacitor Clcb in the step-down capacitor, and thus charge voltages between the first liquid crystal capacitor Clca and the second liquid crystal capacitor Clcb may be set to be different from each other. In the liquid crystal display according to an exemplary embodiment of the present invention, the first liquid crystal capacitor Clca and the second liquid crystal capacitor Clcb may be connected to different data lines to receive different data voltages, and thus charge voltages between the first liquid crystal capacitor Clca and the second liquid crystal capacitor Clcb may be set to be different from each other. The charge voltages between the first liquid crystal capacitor Clca and the second liquid crystal capacitor Clcb may be set to be different from each other by various methods.

Referring to FIG. 5 and FIG. 6, the liquid crystal display according to an exemplary embodiment of the present invention may include a lower display panel 100 and an upper display panel 200 facing each other. A liquid crystal layer 3 may be disposed between the two display panels 100 and 200, and a polarizer may be disposed on outer surfaces of each of the display panels 100 and 200.

The lower display panel 100 will be described below in more detail.

A gate conductor including a gate line 121 and a divided voltage reference voltage line 131 may be disposed on an insulating substrate 110. The insulating substrate 110 may include transparent glass or plastics.

The gate line 121 may include a first gate electrode 124a, a second gate electrode 124b, a third gate electrode 124c, and a wide end portion which may connect to another layer or an external driving circuit.

The divided voltage reference voltage line 131 may include first storage electrodes 135 and 136 and a reference electrode 137. Second storage electrodes 138 and 139 may be included which are not connected to the divided voltage reference voltage line 131 but overlap with a second subpixel electrode 191b.

A gate insulating layer 140 may be disposed on the gate line 121 and the divided voltage reference voltage line 131.

A first semiconductor layer 154a, a second semiconductor layer 154b, and a third semiconductor layer 154c may be disposed on the gate insulating layer 140. A plurality of ohmic contacts 163a, 165a, 163b, 165b, 163c, and 165c may be disposed on the semiconductor layers 154a, 154b, and 154c. The ohmic contacts may be omitted according to an exemplary embodiment of the present invention.

A plurality of data lines 171 including a first source electrode 173a and a second source electrode 173b and a data conductor including a first drain electrode 175a, a second drain electrode 175b, a third source electrode 173c, and a third drain electrode 175c may be disposed on the ohmic contacts 163a, 165a, 163b, 165b, 163c, and 165c and the gate insulating layer 140.

The data conductor, the semiconductor disposed under the data conductor, and the ohmic contacts may be simultaneously formed using a single mask.

The data line 171 may include a wide end portion which may connect to another layer or an external driving circuit.

The first gate electrode 124a, the first source electrode 173a, and the first drain electrode 175a may form the first thin film transistor Qa along with the first semiconductor layer 154a, and a channel of the first thin film transistor Qa may be disposed at the first semiconductor layer 154a between the first source electrode 173a and the first drain electrode 175a. Similarly, the second gate electrode 124b, the second source electrode 173b, and the second drain electrode 175b may form the second thin film transistor Qb along with the second semiconductor layer 154b, and a channel of the second thin film transistor Qb may be disposed at the second semiconductor layer 154b between the second source electrode 173b and the second drain electrode 175b. The third gate electrode 124c, the third source electrode 173c, and the third drain electrode 175c may form the third thin film transistor Qc along with the third semiconductor layer 154c, and a channel of the third thin film transistor Qc may be disposed at the third semiconductor layer 154c between the third source electrode 173c and the third drain electrode 175c.

The second drain electrode 175b may be connected to the third source electrode 173c and may be connected to the pixel electrode through a wide expansion 177.

A first passivation layer 180p may be disposed on data conductors 171, 173c, 175a, 175b, and 175c and the exposed semiconductors layers 154a, 154b, and 154c. The first passivation layer 180p may be an inorganic insulting layer including silicon nitride or silicon oxide. The first passivation layer 180p may reduce or prevent a pigment of a color filter 230 from flowing into the exposed semiconductor layers 154a, 154b, and 154c.

The color filter 230 may be disposed on the first passivation layer 180p. The color filter 230 may extend in a vertical direction along two adjacent data lines. A light blocking member 220 may be disposed on the first passivation layer 180p, an edge of the color filter 230, and the data line 171.

The light blocking member 220 may extend along the data line 171, and may be disposed between two adjacent color filters 230. A width of the light blocking member 220 may be wider than a width of the data line 171. The width of the light blocking member 220 may be wider than the width of the data line 171 so that the light blocking member 220 may reduce or prevent light incident from the outside from being reflected from a surface of the data line 171, which may be a metal data line. Light reflected from the surface of the data line 171 may interfere with light passing through the liquid crystal layer 3, which may reduce or prevent a contrast ratio of the liquid crystal display from being decreased. Exemplary embodiments of the present invention are described in which the light blocking member 220 is disposed in exemplary locations, however exemplary embodiments of the present invention are not limited thereto and a shielding electrode (not shown) which may be disposed in the same layer as the pixel electrode may replace the light blocking member 220.

The light blocking member 220 may cover the first transistor Qa, the second transistor Qb, and the third transistor Qc, and may extend in the same direction as the gate line 121 to overlap the portion of the data line 171. The light blocking member 220 may overlap at least a portion of data lines 171 disposed at both sides of one pixel area to prevent light leakage generated near the data line 171 and the gate line 121. Light leakage may be reduced or prevented in the region where the first transistor Qa, the second transistor Qb, and the third transistor Qc are disposed.

A second passivation layer 180q may be disposed on the color filter 230 and the light blocking member 220.

The second passivation layer 180q may include an inorganic insulating layer such as silicon nitride or silicon oxide. The second passivation layer 180q may reduce or prevent peeling of the color filter 230, and may reduce or prevent contamination of the liquid crystal layer 3 by an organic material such as a solvent flowing from the color filter 230 and may reduce or prevent defects such as afterimages that may occur when an image is driven.

One of the first passivation layer 180p and the second passivation layer 180q may be omitted.

A first contact hole 185a and a second contact hole 185b through which the first drain electrode 175a and the second drain electrode 175b are exposed may be disposed in the first passivation layer 180p and the second passivation layer 180q.

A third contact hole 185c through which a portion of the reference electrode 137 and a portion of the third drain electrode 175c are exposed may be disposed in the first passivation layer 180p, the second passivation layer 180q, and the gate insulating layer 140. The third contact hole 185c may be covered by a connecting member 195. The connecting member 195 may electrically connect the reference electrode 137 and the third drain electrode 175c exposed through the third contact hole 185c.

A plurality of pixel electrodes 191 may be disposed on the second passivation layer 180q. The pixel electrodes 191 may be separated from each other and the gate line 121 may be disposed between the pixel electrodes 191. Each of the pixel electrodes 191 may include a first sub-pixel electrode 191a and a second sub-pixel electrode 191b, which may be adjacent in a column direction based on the gate line 121.

The pixel electrode 191 may include a transparent material such as ITO and/or IZO. The pixel electrode 191 may include a transparent conductive material such as ITO or IZO, or a reflective metal such as aluminum, silver, chromium, or an alloy thereof.

The first sub-pixel electrode 191a and the second sub-pixel electrode 191b may each include a basic electrode 199 illustrated in FIG. 7 or one or more modifications thereof.

The first sub-pixel electrode 191a and the second sub-pixel electrode 191b may be physically and electrically connected through the first contact hole 185a and the second contact hole 185b to the first drain electrode 175a and the second drain electrode 175b, respectively. The first sub-pixel electrode 191a and the second sub-pixel electrode 191b may receive a data voltage from the first drain electrode 175a and the second drain electrode 175b. A portion of the data voltage applied to the second drain electrode 175b may be divided through the third source electrode 173c, and thus a magnitude of a voltage applied to the first sub-pixel electrode 191a may be greater than a magnitude of a voltage applied to the second sub-pixel electrode 191b.

The first sub-pixel electrode 191a and the second sub-pixel electrode 191b to which the data voltage is applied may generate an electric field together with the common electrode 270 of the upper display panel 200 to determine a direction of the liquid crystal molecules 31 of the liquid crystal layer 3 between the pixel electrode 191 and the common electrode 270. The luminance of light passing through the liquid crystal layer 3 may be changed according to the direction of the liquid crystal molecules 31.

The first passivation layer 180p, the color filter 230, and the second passivation layer 180q may be disposed in the region where the first transistor Qa, the second transistor Qb, the third transistor Qc, and the first to third contact hole 185a, 185b, and 185c are, thus distinguishing positions of the first transistor Qa, the second transistor Qb, the third transistor Qc, and the first to third contact holes 185a, 185b, and 185c.

The first alignment layer 11 may be disposed on the pixel electrode 191. The first alignment layer 11 may be substantially the same as the first alignment layer 11 according to the above described exemplary embodiment of the present invention.

The first alignment layer 11 may include the reactive mesogen (RM) combined by the UV radiation. That is, the reactive mesogen included in the liquid crystal layer 3 may be combined with the photo-reactive group by the UV radiation to form the alignment polymer. The alignment polymer may pre-tilt the liquid crystal molecules 31 adjacent to the first alignment layer 11.

The liquid crystal layer 3 may have a negative dielectric anisotropy, and liquid crystal molecules 31 of the liquid crystal layer 3 may be vertically aligned with respect to the surface of the lower and upper display panels 100 and 200.

The liquid crystal layer 3 may include the reactive mesogen. When the reactive mesogen is included in the first alignment layer 11 by UV radiation, a relatively small amount of the reactive mesogen may remain in the liquid crystal layer 3.

The upper panel 200 will be described below in more detail.

The common electrode 270 may be disposed on a surface of the second insulation substrate 210 facing the first insulation substrate 110, and the second alignment layer 21 may be disposed on a surface of the common electrode 270 facing the first insulation substrate 110.

The second alignment layer 21 may be substantially the same material as the second alignment layer 21 according to the above described exemplary embodiments of the present invention and the liquid crystal molecules 31 adjacent to the second alignment layer 21 may be vertically aligned. In this case, the liquid crystal display may be the curved display device.

The liquid crystal display may include the second alignment layer 21 according to an exemplary embodiment of the present invention. In this case, the liquid crystal molecules 31 adjacent to the second alignment layer 21 may have the pre-tilt angle. The liquid crystal display according to an exemplary embodiment of the present invention may be the flat liquid crystal display.

The basic electrode 199 will be described in more detail with reference to FIG. 7.

As shown in FIG. 7, the basic electrode 199 may have a quadrangular shape. The basic electrode 199 may include a cross-shaped stem including a transverse stem 193 and a vertical stem 192 that is perpendicular to the transverse stem 193. The basic electrode 199 may be divided into a first subregion Da, a second subregion Db, a third subregion Dc, and a fourth subregion Dd by the transverse stem 193 and the vertical stem 192. Each subregion Da, Db, Dc, and Dd may include a plurality of first to fourth minute branches 194a, 194b, 194c, and 194d.

The first minute branch 194a may obliquely extend from the transverse stem 193 or the longitudinal stem 192 in the upper-left direction. The second minute branch 194b may obliquely extend from the transverse stem 193 or the longitudinal stem 192 in the upper-right direction. The third minute branch 194c may obliquely extend from the transverse stem 193 or the longitudinal stem 192 in the lower-left direction. The fourth minute branch 194d may obliquely extend from the transverse stem 193 or the longitudinal stem 192 in the lower-right direction.

The first to fourth minute branches 194a, 194b, 194c, and 194d may form an angle of about 45° or about 135° with respect to the gate lines 121a and 121b or the horizontal stem portion 193. The minute branches 194a, 194b, 194c, and 194d of the two adjacent sub-regions Da, Db, Dc, and Dd may be orthogonal to each other.

Widths of the minute branches 194a, 194b, 194c, and 194d may be from about 2.5 µm to about 5.0 µm and a gap between the adjacent minute branches 194a, 194b, 194c, and 194d in one sub-region Da, Db, Dc, or Dd may be from about 2.5 µm to about 5.0 µm.

According to another exemplary embodiment of the present invention, the widths of the minute branches 194a, 194b, 194c, and 194d may be increased as the minute branches become closer to the horizontal stem portion 193 or the vertical stem portion 192. A difference between the largest width portion and the narrowest portion in one of the minute branches 194a, 194b, 194c, or 194d may be from about 0.2 µm to about 1.5 µm.

The first sub-pixel electrode 191a and the second sub-pixel electrode 191b may be connected through the first contact hole 185a and the second contact hole 185b to the first drain electrode 175a or the second drain electrode 175b, and may receive a data voltage from the first drain electrode 175a and the second drain electrode 175b. In this case, sides of the first to fourth minute branches 194a, 194b, 194c, and 194d may distort an electric field to generate a horizontal component determining an inclination direction of the liquid crystal molecules 31. The horizontal components of the electric field may be substantially horizontal with respect to the sides of the first to fourth fine branch portions 194a, 194b, 194c, and 194d. As illustrated in FIG. 5, the liquid crystal molecules 31 may be inclined in a direction that is parallel to length directions of the fine branch portions 194a, 194b, 194c, and 194d. Since one pixel electrode 191 may include four sub-regions Da to Dd in which length directions of the fine branch portions 194a, 194b, 194c, and 194d are different from each other, there may be about four directions along which the liquid crystal molecules 31 are inclined, and there may be four domains where the alignment directions of the liquid crystal molecules 31 are different from each other in the liquid crystal layer 3. As described above, when the inclination directions of the liquid crystal molecules 31 are diversified, a reference viewing angle of the liquid crystal display may be increased.

Figure 8:
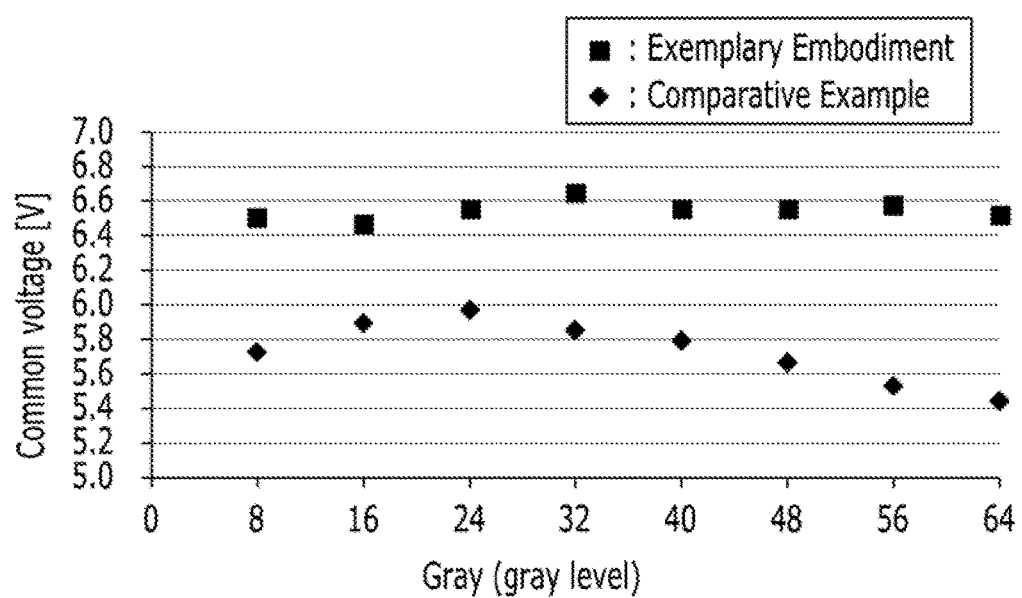
FIG. 8 is a graph of a common voltage value for each gray level according to an exemplary embodiment of the present invention and a comparative example.

A compensation degree of the common voltage of the liquid crystal display according to an exemplary embodiment of the present invention will be described in more detail with reference to FIG. 8. FIG. 8 is a graph of a common voltage value for each gray level according to an exemplary embodiment of the present invention and a comparative example.

The liquid crystal display according to an exemplary embodiment of the present invention may include the first alignment layer 11 and the second alignment layer 21 that are different from each other, and the first alignment layer 11 may be positively charged and the second alignment layer 21 may be negatively charged.

The common voltage value may depend on the gray level. A maximum value and a minimum value may have a difference of about 0.11V. Thus, the predetermined DC voltage formed by the alignment layer according to an exemplary embodiment of the present invention may compensate for the common voltage depending on the gray level.

In a Comparative Example, the liquid crystal display may include the first and second alignment layers of the same material. In this case, referring to the common voltage value depending on the gray level, the maximum value and the minimum value may have a difference of about 0.53V. Thus, the liquid crystal display according to the Comparative Example may have a certain degree of loss of the common voltage depending on the gray level.

As illustrated in the graph shown in FIG. 8, the common voltage deviation depending on the gray level may be reduced by about by ⅕ according to an exemplary embodiment of the present invention. The reduction of the common voltage deviation may reduce or prevent the occurrence of an afterimage in display device and the display quality and the reliability of the liquid crystal display may be increased.

In the liquid crystal display according to exemplary embodiments of the present invention, when the upper and lower panels are curved and the upper and lower panels are misaligned, the first alignment layer may provide the pre-tilt angle to the liquid crystal molecules adjacent to the first alignment layer and the liquid crystal molecules adjacent to the second alignment layer may be vertically aligned without the pre-tilt. Accordingly, although the upper and lower panels may be misaligned, the deviation of the liquid crystal molecules might not be generated, thereby reducing or preventing the transmittance deterioration and the display quality deterioration of the display device.

The liquid crystal display according to an exemplary embodiment of the present invention may form the predetermined DC voltage through the first alignment layer 11 and the second alignment layer 21 that are differently charged such that the loss of the common voltage depending on the gray level is compensated for, thereby providing the liquid crystal display with increased display quality.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A liquid crystal display comprising:
a first insulation substrate;
a pixel electrode disposed on the first insulation substrate;
a first alignment layer disposed on the pixel electrode;
a second insulation substrate facing the first insulation substrate;
a common electrode disposed on a surface of the second insulation substrate facing the first insulation substrate;
a second alignment layer disposed on a surface of the common electrode facing the first insulation substrate; and
a liquid crystal layer disposed between the first alignment layer and the second alignment layer, wherein the liquid crystal layer includes liquid crystal molecules, and
wherein one of the first alignment layer and the second alignment layer has an electron-rich group and the other has an electron-deficient group, and the liquid crystal display is configured to provide a predetermined DC voltage through the first alignment layer and the second alignment layer, which are differentially charged.

2. The liquid crystal display of claim 1, wherein the first alignment layer and the second alignment layer each include a main chain and a side chain connected to the main chain.

3. The liquid crystal display of claim 2, wherein the side chain of the first alignment layer includes the electron-deficient group.

4. The liquid crystal display of claim 3, wherein the electron-deficient group is an amine group.

5. The liquid crystal display of claim 2, wherein the side chain of the second alignment layer includes the electron-rich group.

6. The liquid crystal display of claim 2, wherein the side chain of the first alignment layer includes a terminal group having the electron-deficient group and the side chain of the second alignment layer includes a terminal group having the electron-rich group.

7. The liquid crystal display of claim 2, wherein each side chain includes a vertical alignment group.

8. The liquid crystal display of claim 2, wherein at least one of the side chains of the first alignment layer and the second alignment layer includes a photo-reactive group or a photo-reactive derivative.

9. The liquid crystal display of claim 1, wherein the first alignment layer and the second alignment layer each include a first structure unit represented by Chemical formula 1,

[Chemical formula 1]

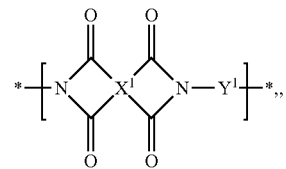

wherein in Chemical formula 1, $X^1$ is independently a tetravalent organic group derived from an alicyclic acid dianhydride or an aromatic acid dianhydride, wherein $Y^1$ is a divalent organic group derived from an aromatic diamine, wherein at least one hydrogen of the divalent organic group is substituted by Chemical formula 1 A,

[Chemical formula 1A]

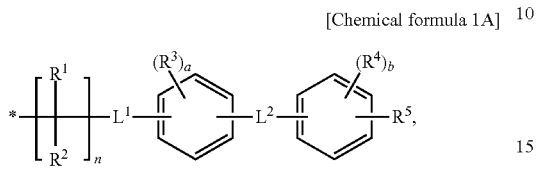

wherein in Chemical formula 1A, $R^1$ to $R^4$ are independently hydrogen or a substituted or unsubstituted C1 to C8 alkyl group, n is an integer between 3 to 20, $R^5$ is a substituted or unsubstituted C1 to C30 alkyl group, a and b are independently an integer between 0 to 4, $L^1$ and $L^2$ are independently the single bond, —O—, —S(=O)$_2$—, or —(C(R$^x$)(R$^y$))$_m$—, and wherein $R^x$ and $R^y$ are each independently a hydrogen atom, or a substituted or unsubstituted C1 to C8 alkyl group and m is an integer between 1 to 20.

10. The liquid crystal display of claim 1, wherein at least one of the first alignment layer and the second alignment layer includes a second structure unit represented by Chemical formula 2,

[Chemical formula 2]

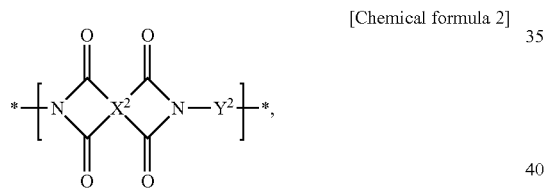

wherein in Chemical formula 2, $X^2$ is independently a tetravalent organic group derived from an alicyclic acid dianhydride or an aromatic acid dianhydride, $Y^2$ is a divalent organic group derived from the aromatic diamine, at least one hydrogen of the divalent organic group is substituted by Chemical formula 2A or Chemical formula 2B,

[Chemical formula 2A]

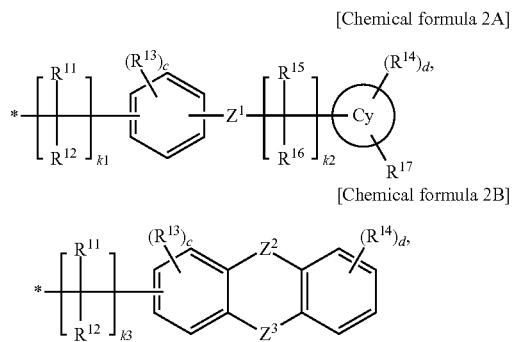

[Chemical formula 2B]

and wherein in Chemical formula 2A and Chemical formula 2B, Cy is a C6 to C18 aryl group or a C6 to C18 cycloalkyl group, $R^{11}$ to $R^{14}$ are independently hydrogen or a substituted or unsubstituted C1 to C8 alkyl group, $R^{15}$ and $R^{16}$ are independently a hydroxyl group or a substituted or unsubstituted C1 to C8 alkoxy group, $R^{17}$ is hydrogen, a hydroxyl group, or a substituted or unsubstituted C1 to C8 alkoxy group, c and d are independently an integer between 0 to 4, k1 and k3 are an integer between 3 to 20, k2 is an integer between 0 to 5, $Z^1$ and $Z^2$ are independently —C(=O)—, and $Z^3$ is —S— or —C(=O)—.

11. The liquid crystal display of claim 1, wherein the second alignment layer includes a fourth structure unit represented by Chemical formula 4,

[Chemical formula 4]

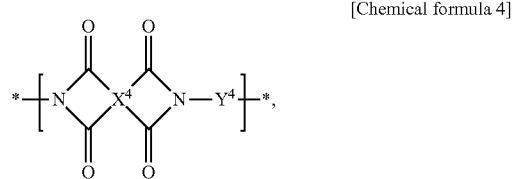

wherein in Chemical formula 4, $X^4$ is independently a tetravalent organic group derived from an alicyclic acid dianhydride or an aromatic acid dianhydride, wherein $Y^4$ is a divalent organic group derived from an aromatic diamine, at least one hydrogen of the divalent organic group is substituted by a substituted or unsubstituted C5 to C30 straight chain or branched chain alkyl group, wherein —CH$_2$— groups that are not adjacent to each other in the alkyl group may be substituted by —O—, —N(R$^a$)—, —C(=O)O—, —C(=O)N(R$^b$)—, —N(R$^c$)C(=O)—, or —OC(=O)—, wherein R$^a$, R$^b$, and R$^c$ are substituted independently by hydrogen or the substituted or unsubstituted C1 to C8 alkyl group, and wherein the terminal group of $Y^4$ includes one of

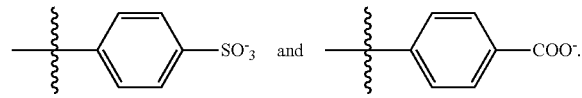

12. The liquid crystal display of claim 1, wherein the liquid crystal layer has a negative dielectric anisotropy.

13. The liquid crystal display of claim 8, wherein the liquid crystal layer further includes a reactive mesogen (RM).

14. The liquid crystal display of claim 13, wherein at least one of the first alignment layer and the second alignment layer includes an alignment polymer in which the photo-reactive group or the photo-reactive derivative is reacted with the reactive mesogen.

15. The liquid crystal display of claim 1, wherein the liquid crystal display is a curved type liquid crystal display.

16. The liquid crystal display of claim 15, wherein the liquid crystal display is curved in a long side direction.

17. The liquid crystal display of claim 1, wherein the liquid crystal molecule adjacent to the first alignment layer has a pre-tilt angle.

18. The liquid crystal display of claim 8, wherein the second alignment layer does not include the photo-reactive group or the photo-reactive derivative.

19. The liquid crystal display of claim 18, wherein the liquid crystal molecule adjacent to the second alignment layer does not have the pre-tilt.

20. A liquid crystal display, comprising:
a first insulation substrate;
a pixel electrode disposed on the first insulation substrate;
a first alignment layer disposed on the pixel electrode;
a second insulation substrate facing the first insulation substrate;
a common electrode disposed on a surface of the second insulation substrate facing the first insulation substrate;
a second alignment layer disposed on a surface of the common electrode facing the first insulation substrate; and
a liquid crystal layer disposed between the first alignment layer and the second alignment layer, wherein the liquid crystal layer includes liquid crystal molecules, and
wherein one of the first alignment layer and the second alignment layer has an electron-rich group and the other has an electron-deficient group,
wherein the first alignment layer includes a third structure unit represented by Chemical formula 3,

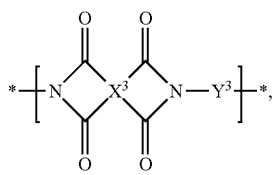

[Chemical formula 3]

wherein in Chemical formula 3, $X^3$ is independently a tetravalent organic group derived from an alicyclic acid dianhydride or an aromatic acid dianhydride,
wherein $Y^3$ is a divalent organic group derived from an aromatic diamine, at least one hydrogen of the divalent organic group is substituted by a substituted or unsubstituted C5 to C30 straight chain or a branched chain alkyl group, wherein —$CH_2$— groups that are not adjacent to each other in the alkyl group may be substituted by —O—, —N($R^a$)—, —C(=O)O—, —C(=O)N($R^b$)—, —N($R^c$)C(=O)—, or —OC(=O)—, wherein $R^a$, $R^b$, and $R^c$ are each independently hydrogen or a substituted or unsubstituted C1 to C8 alkyl group, and wherein a terminal group of $Y^3$ includes

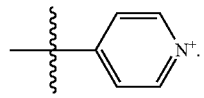

21. A liquid crystal display comprising:
a first insulation substrate;
a pixel electrode disposed on the first insulation substrate;
a first alignment layer disposed on the pixel electrode;
a second insulation substrate facing the first insulation substrate;
a common electrode disposed on a surface of the second insulation substrate facing the first insulation substrate;
a second alignment layer disposed on a surface of the common electrode facing the first insulation substrate; and
a liquid crystal layer disposed between the first alignment layer and the second alignment layer, wherein the liquid crystal layer includes a plurality of liquid crystal molecules disposed adjacent to the first alignment layer and a plurality of liquid crystal molecules disposed adjacent to the second alignment layer,
wherein the plurality of liquid crystal molecules adjacent to the first alignment layer have a pre-tilt angle with respect to the first alignment layer, wherein the plurality of liquid crystal molecules adjacent to the second alignment layer are vertically aligned with respect to the second alignment layer, and the liquid crystal display is configured to provide a predetermined DC voltage through the first alignment layer and the second alignment layer, and wherein the first alignment layer is positively charged and the second alignment is negatively charged.

22. The liquid crystal display of claim 21, wherein the liquid crystal display is a curved type liquid crystal display.

23. The liquid crystal display of claim 21, wherein the first alignment layer and the second alignment layer each include a main chain and a side chain connected to the main chain, and wherein the side chain of the first alignment layer includes an electron-deficient group.

24. The liquid crystal display of claim 23, wherein the electron-deficient group is an amine group.

25. The liquid crystal display of claim 23, wherein the side chain of the second alignment layer includes an electron-rich group.

* * * * *